United States Patent [19]

Lobjinski et al.

[11] Patent Number: 4,955,015
[45] Date of Patent: Sep. 4, 1990

[54] SELF-CONTROLLED CONCENTRATOR OPERATING PACKET-SYNCHRONIZED FOR FAST DATA PACKET SWITCHING NETWORKS

[75] Inventors: Manfred Lobjinski; Michael Horn; Andreas Reppekus, all of Munich, Fed. Rep. of Germany

[73] Assignee: Siemens Aktiengesellschaft, Berlin and Munich, Fed. Rep. of Germany

[21] Appl. No.: 229,295

[22] Filed: Aug. 8, 1988

[30] Foreign Application Priority Data

Sep. 29, 1987 [DE] Fed. Rep. of Germany ....... 3732824

[51] Int. Cl.[5] .......................................... H04L 12/56
[52] U.S. Cl. ........................................ 370/56; 370/60; 370/94.3
[58] Field of Search ..................... 370/56, 60, 94, 94.3, 370/94.1; 340/825.02, 826

[56] References Cited

U.S. PATENT DOCUMENTS

| | | | |
|---|---|---|---|
| 4,173,713 | 11/1979 | Giesken et al. | 370/56 |
| 4,531,209 | 7/1985 | Knauer | 370/56 |
| 4,630,260 | 12/1986 | Toy et al. | 370/60 |

Primary Examiner—Douglas W. Olms
Assistant Examiner—Melvin Marcelo
Attorney, Agent, or Firm—Hill, Van Santen, Steadman & Simpson

[57] ABSTRACT

A self-controlled concentrator for packet-synchronous for fast data packet switching networks has the first bits of the totality of input data packets act on the totality of the switch elements of the concentrator in accordance with the switch positions thereof. The switch elements are beta elements ($\beta$), having two inputs and two outputs, whereby 1d n stages of n/2 beta elements ($\beta$) each are provided in which n is the number of inputs and outputs of the concentrator. A connecting structure that represents a perfect shuffle is provided between the stages of beta elements. The stages are divided into blocks such that the plurality of blocks increases according to a power of 2, ascending from stage to stage, whereby the plurality of blocks in the first stage is $2^0$, that in the second stage is $2^1$, etc., whereby n/2 blocks form the last stage to produce a binary tree structure. Dependent on the type of signal pair supplied to it, a beta element ($\beta$) acts on a neighboring bete element to control the switch position thereof such that a concentration of the bits having a prescribed binary value at the outputs of the concentrator is produced at the last stage of the concentrator to produce a concentration of the data packets.

6 Claims, 4 Drawing Sheets $a \geq b$ $a < b$ $a \geq b$ $a < b$

FIG. 4
FIG. 6
FIG. 8
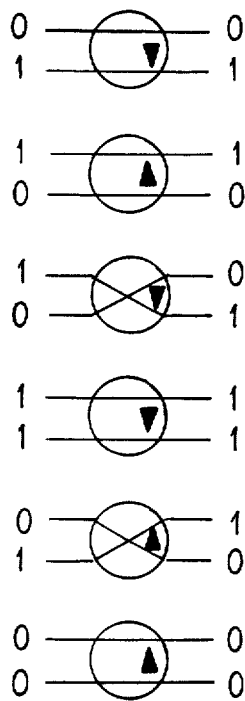
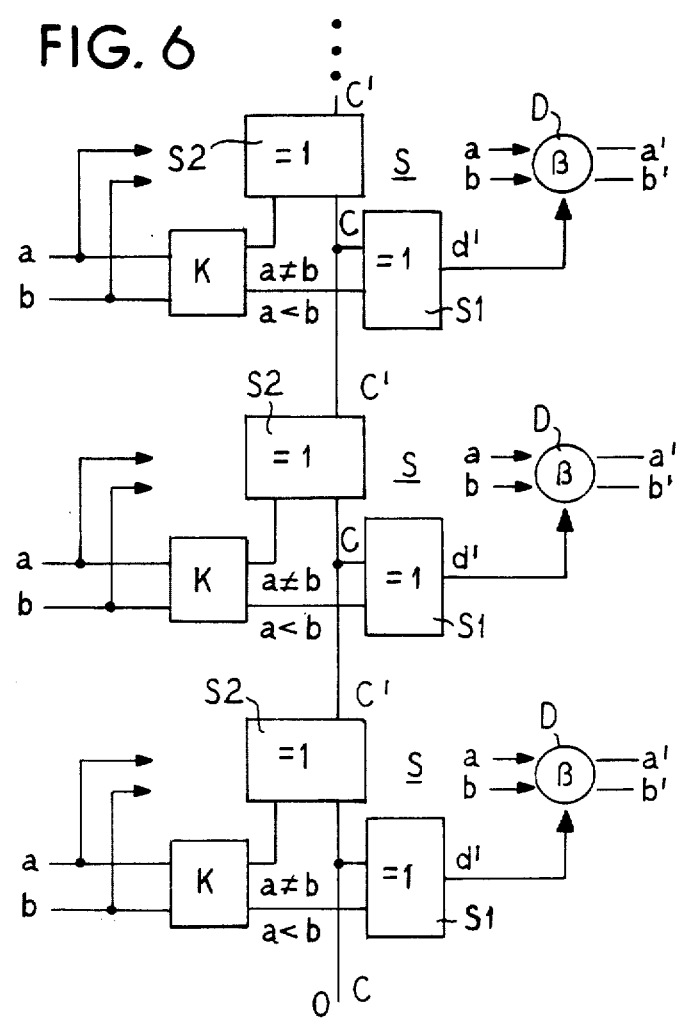
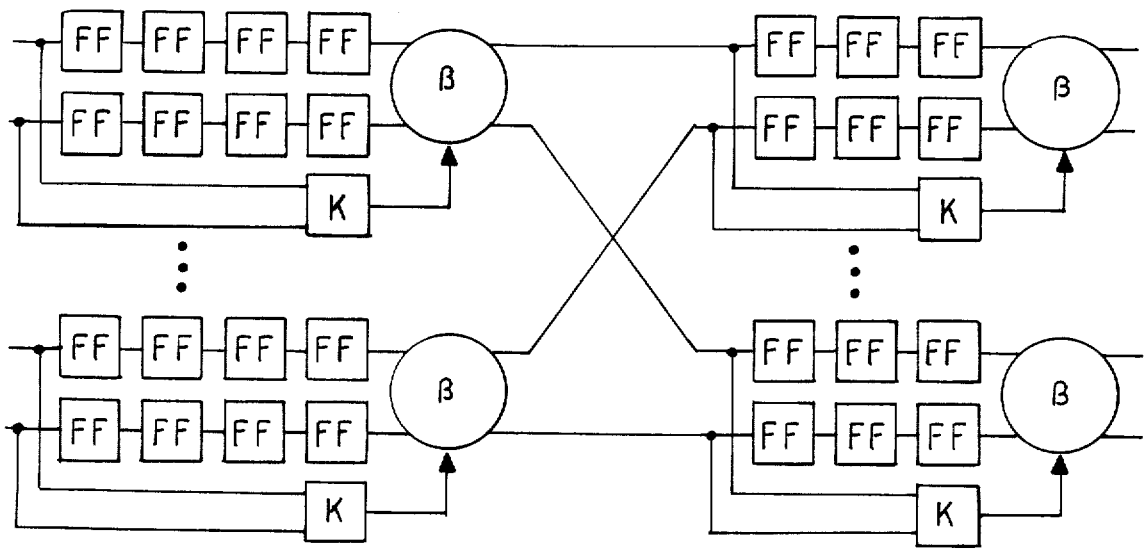

SELF-CONTROLLED CONCENTRATOR OPERATING PACKET-SYNCHRONIZED FOR FAST DATA PACKET SWITCHING NETWORKS

BACKGROUND OF THE INVENTION

The present invention is directed to a self-controlled concentrator for packet-synchronized fast data packet switching networks, wherein the totality of the respectively first bits of the input data packets controls the totality of the switch elements of the concentrator in accordance with their switch positions.

In communication nodes for communicating information (voice and data), the incoming lines are usually not fully occupied. In order to be able to construct the node itself correspondingly smaller, a concentrator is connected between the incoming lines and the nodes. It concentrates the incoming messages onto a smaller plurality of lines. Such a concentrator should be suitable for future packet switching networks and should operate in decentralized fashion, i.e. the path setting for the packets should ensue in the individual cross points and not in a central processor.

International patent application (PCT) WO 84/04011 discloses a proposed solution for such a concentrator. Its principles are described below in direct comparison to the present invention.

SUMMARY OF THE INVENTION

The object of the present invention is to create a packet-synchronized concentrator that functions to separate data packets from "empty" packets.

This object is achieved by a concentrator having plural sets of beta elements for selectively guiding the paths of incoming signals through he concentrator, each in accordance with the incoming signals and the state of adjacent beta elements.

Advantageous improvements of the invention are characterized by the features recited in the claims.

BRIEF DESCRIPTION OF THE DRAWINGS

The present invention shall be set forth in greater detail below with reference to a number of figures:

FIG. 4 schematically shows the structure of the first stage of the concentrator with an example of the input occupation and the positions of the beta elements;

FIG. 6 shows a beta element block having mod-2 sum formation and conditioned inversion (crossing) of the beta element;

FIG. 8 shows an example of a circuit arrangement for delaying packes for an on-going sum formation.

DESCRIPTION OF THE PREFERRED EMBODIMENT

The functioning of a concentrator comprising $2^n$ input lines shall be set forth below.

All packets arrive synchronously at the concentrator. The data packets differ from the "empty" packets on the basis of the first bit of the address, referred to as the "activity bit". Data packets are thereby identified with a "0" and empty packets are identified with a "1".

Figure 1A:
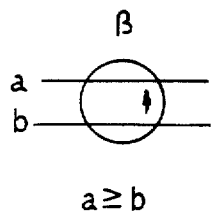
FIGS. 1A–1C schematically show the function and the wiring of a beta element to be employed in accord with the invention.
Figure 1B:
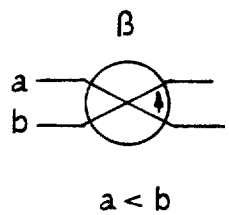
Figure 1C:
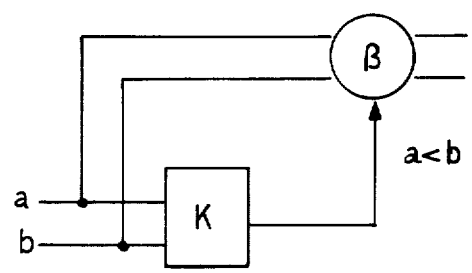

The concentrator is composed of beta elements each comprising a comparator K that compares the two bits adjacent at the inputs and conducts the higher in the arrow direction (FIG. 1). Given identical bits, the position of the beta element is initially undefined. At the beginning of a packet clock, the concentrated receives $2^n$ packets that are to be separated in accord with their activity bit. The packets first pass a beta element stage having a set of beta elements, in which their activity bits are compared to one another in pairs and in which they are interchanged with one another in pairs in accord with a specific sorting method. In accord therewith, they are mixed in a defined way by a connecting structure referred to as a "perfect shuffle" unit, so as to form new pairs of packets that are compared to one another in the next beta element stage, having another set of beta elements. In this way, the packets traverse n combinations of beta elements and perfect shuffles, whereby the data packets are separated from the "empty" packets (cf., FIG. 2). The perfect shuffle units conduct the packets from the lowest beta element of the first set to the lowest beta element of two further sets, each having half as many elements or members as the first set. Packets from the next lowest beta element of the first set are conducted to the next lower elements of the further sets, etc.

In other words, a sequence of 1, n 2, n+1, . . . , becomes ordered after a perfect shuffle in the sequence 1, 2, . . . 2n.

Figure 2:
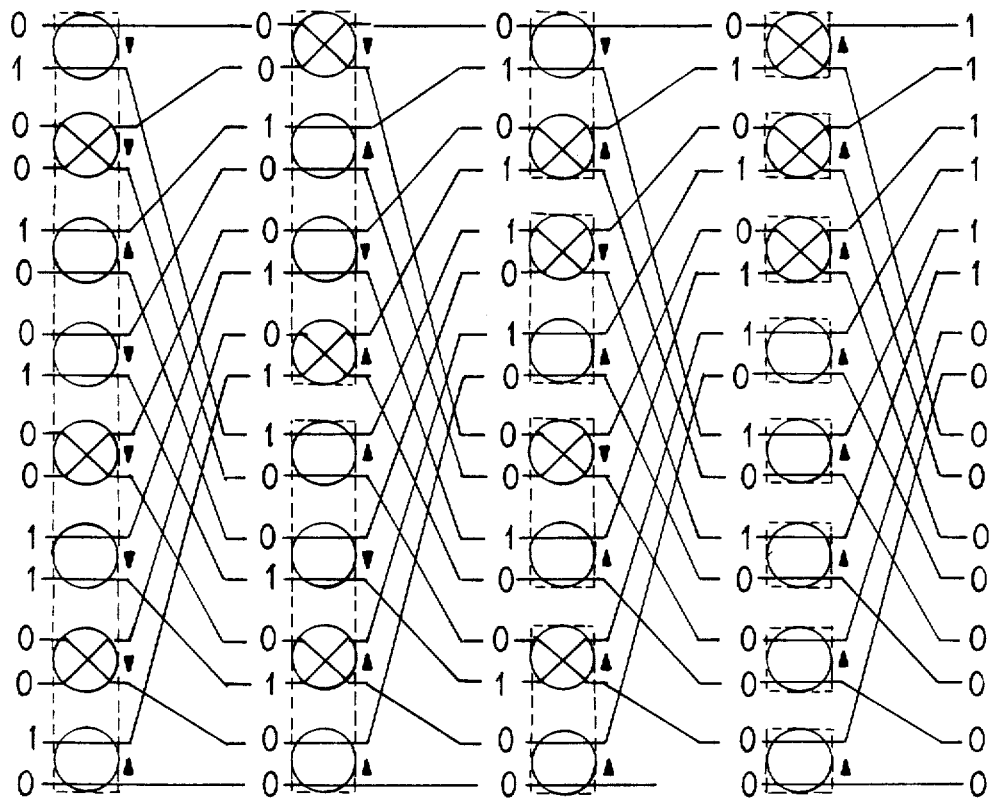
FIG. 2 schematically shows the structure of an exemplary embodiment of a concentrator of the invention for 16 data packets.

The sorting algorithm controls the beta elements dependent on the "empty" packets and on the data packets in the following way:

In the first beta element column, the lowest beta element is "switched up". That means that, given comparison of an "empty" packet (bit 1) to a data packet (bit 0), the packet having the higher activity bit, i.e. the empty packet, is conducted up, irrespective of which input of the beta element it arrived at. If both inputs to the lowest beta element are data packets, or if both are empty packets, then both inputs proceed through the beta element in unswitched fashion, as shown in FIG. 2.

The switching of the second lowest beta element assuming two inputs corresponding to one data packet and one empty packet, then depends on which packet pair the lowest beta element has compared. When the lowest pair was composed of an "empty" packet and of a data packet, then the second-lowest beta element is "switched down", i.e. the switching direction changes. The switching direction does not change given identical packets at the lowest beta element. In this way, the algorithm controls the beta elements of the first column from bottom to top, whereby the switching direction of each beta element is determined by its predecessor and by the packet pair to be compared by the predecessor. It can be stated in general terms that the arrow direction in the beta element (as illustrated in FIG. 2) points down when an uneven (i.e. odd) number of beta elements having different input values previously occurred, or an odd number of empty packets is present at inputs of the lower order beta elements in a given set of beta elements.

This switching rule is applied to the entire first column of beta elements that compose of only one set of beta elements or one "block". The second column is composed of two blocks that cover the upper and, respectively, lower half of the second column. The alternating control of the beta elements with non-identical control bits is begun anew in every block from below. The lowest beta element in each block switches up. In a corresponding fashion, the $i^{th}$ column is divided into $2^{(i-1)}$ beta element blocks of equal size. The $n^{th}$ column is thus composed of n blocks, i.e. each beta element having non-identical control bits switches the value "1" in the upward direction in this column.

When the two packets that are compared by a beta element both have the same activity bit "1" or "0", then it is irrelevant for the sorting in the concentrator whether the packets are interchanged or not. It is determined that in these cases, as set forth above, the arrow direction is reversed when non-identical activity bits were previously adjacent at an uneven number of beta elements.

Why the algorithm set forth here always leads to the correct result can be made initially clear, first, with reference to an example having 16 input bits, cf. FIG. 2. For ordering the 16 input bits, four beta element shuffle stages are required. The beta elements of one stage, as already described, are combined in blocks. The individual shuffle stages lie between these blocks.

Figure 3:
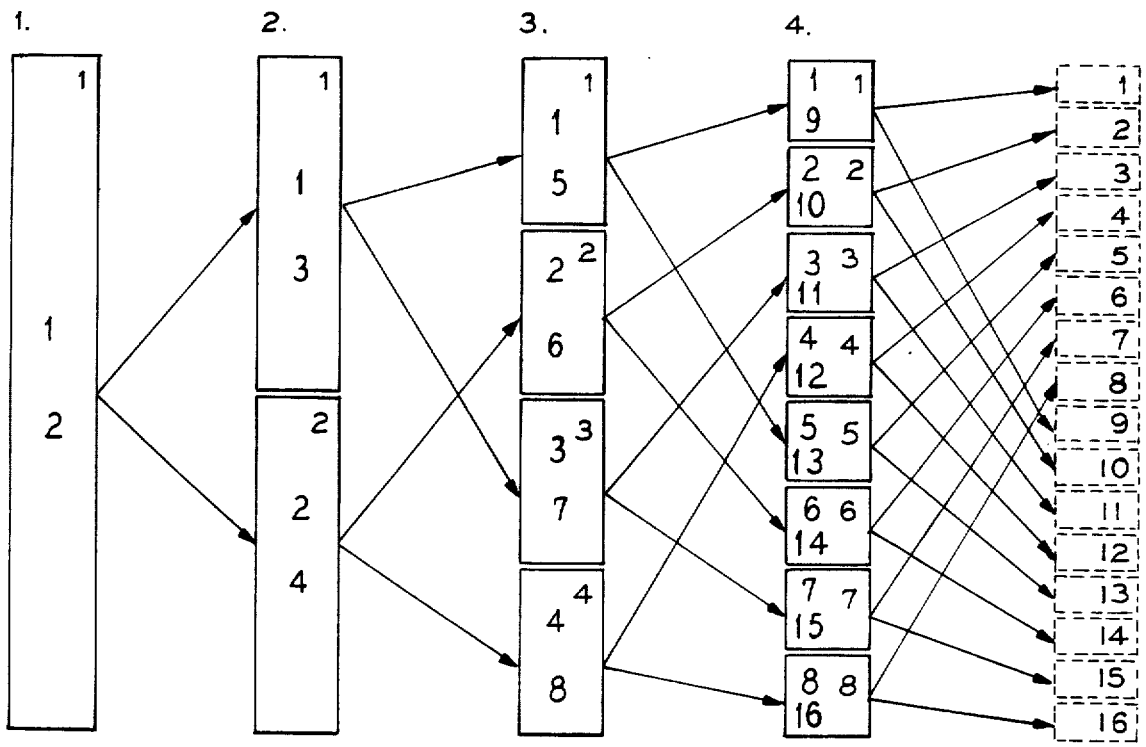
FIG. 3 shows the inner structure of the concentrator illustrating the block division.

FIG. 3 shows the block formation in the concentrator. Every block has three numbers. The small number at the upper right numbers the blocks consecutively in a beta element column. The two larger numbers in the blocks indicate in which two blocks of the next column the packets can be conducted. A packet is thereby conducted into the upper (or, respectively, lower) block of the next column in case it was driven up (or, down) by the beta element. For example, all packets of the first column that are driven up are conducted into block 1 of the second column.

In order for the six empty packets, cf. FIG. 2, to be conducted onto the upper six outputs, the first six blocks of the fourth column must each contain an empty packet. In order to achieve this, the first two blocks of the third column must each contain two empty packets and the remaining two blocks must each contain one empty packet. This, namely, is the only permutation that enables an empty packet to be conducted into each of the first six blocks of the fourth column. This may be seen from the illustration in FIG. 3 when one considers the positions of the numerals 1 through 6 in the third column.

Fundamentally, one must proceed such in every column that the empty packets are distributed in such fashion to the box that it is first the first, then the second, then the third for the last block that respectively contains one packet, a new start is again undertaken in the first block until all empty packets are distributed. In this way, the distribution is obtained wherein the upper blocks of a column contain at most one empty block more than the lower blocks.

This is precisely achieved in that the empty packets are alternately sent up and down with the beta elements. This alternation of the direction is achieved by the alternating control of the beta elements with unequal control bits in the described switching arrangement.

REALIZATION OF THE CONCENTRATOR STRUCTURE:

The synchronously incoming packets are supplied to the concentrator that separates the data packets from the "empty" packets. The data packets are identified by an activity bit "0" and the empty packets are identified by a "1".

Figure 5A:
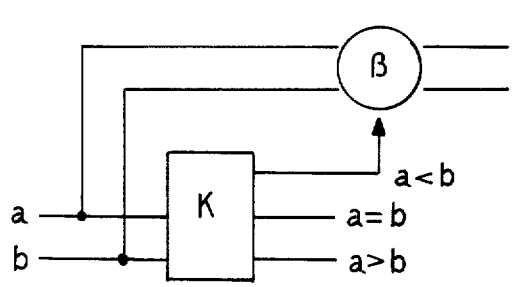
FIGS. 5A–5C schematically show the internal structure of a comparator-controlled beta element.
Figure 5B:
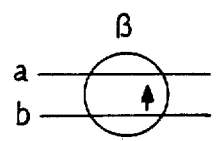
Figure 5C:
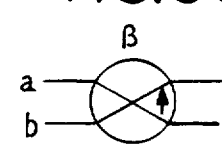

The concentrator is constructed in multi-stage fashion. FIG. 4 shows the first stage comprising an input example. It is composed of beta elements that are controlled by comparators K, shown in FIG. 5. The arrow direction in the beta element indicates at which output the higher value appears. The switching rule for the concentrator prescribes that the arrow direction should be directed down in the beta element within a beta element block (it covers the entire first stage from FIG. 4 here) when there was previously an uneven plurality of beta elements having non-identical input values. A "movement" from bottom to top thereby is produced in FIG. 4. I.e., the mod-2 sum of those beta elements that have different input values must be formed from bottom to top.

For changing the arrow direction, the beta element output signal must once again be conditionally inverted. This can occur with an EXOR gate that inverts one of its input signals in dependence on its second input signal b in accord with the following truth table.

| a | b | c |
|---|---|---|
| 0 | 0 | 0 |
| 0 | 1 | 1 |
| 1 | 0 | 1 |
| 1 | 1 | 0 |

The mod-2 sum formation can also be realized with an EXOR gate, as may be seen from the truth table.

FIG. 6 shows a circuit in which this sum formation and the conditional inverting of the beta element output signal are contained. The EXOR gates (identified by the symbol = 1) join to one another from bottom to top, also corresponding to the chronological sequence of transit times, have the output signal 0 until they are switched by a beta element signal a≠b. With this output signal 1, the outputs of the following EXOR gates (above) controlling the beta elements are inverted, this denoting a reversal of the arrow direction of the beta elements, as shown in FIG. 4.

Given the next beta element signal a≠b, the output signal of the following EXOR gate again changes and the arrow direction again corresponds to the initial arrow direction.

The beta elements thus behave in accord with the rule of the concentrator switching arrangement.

Figure 7:
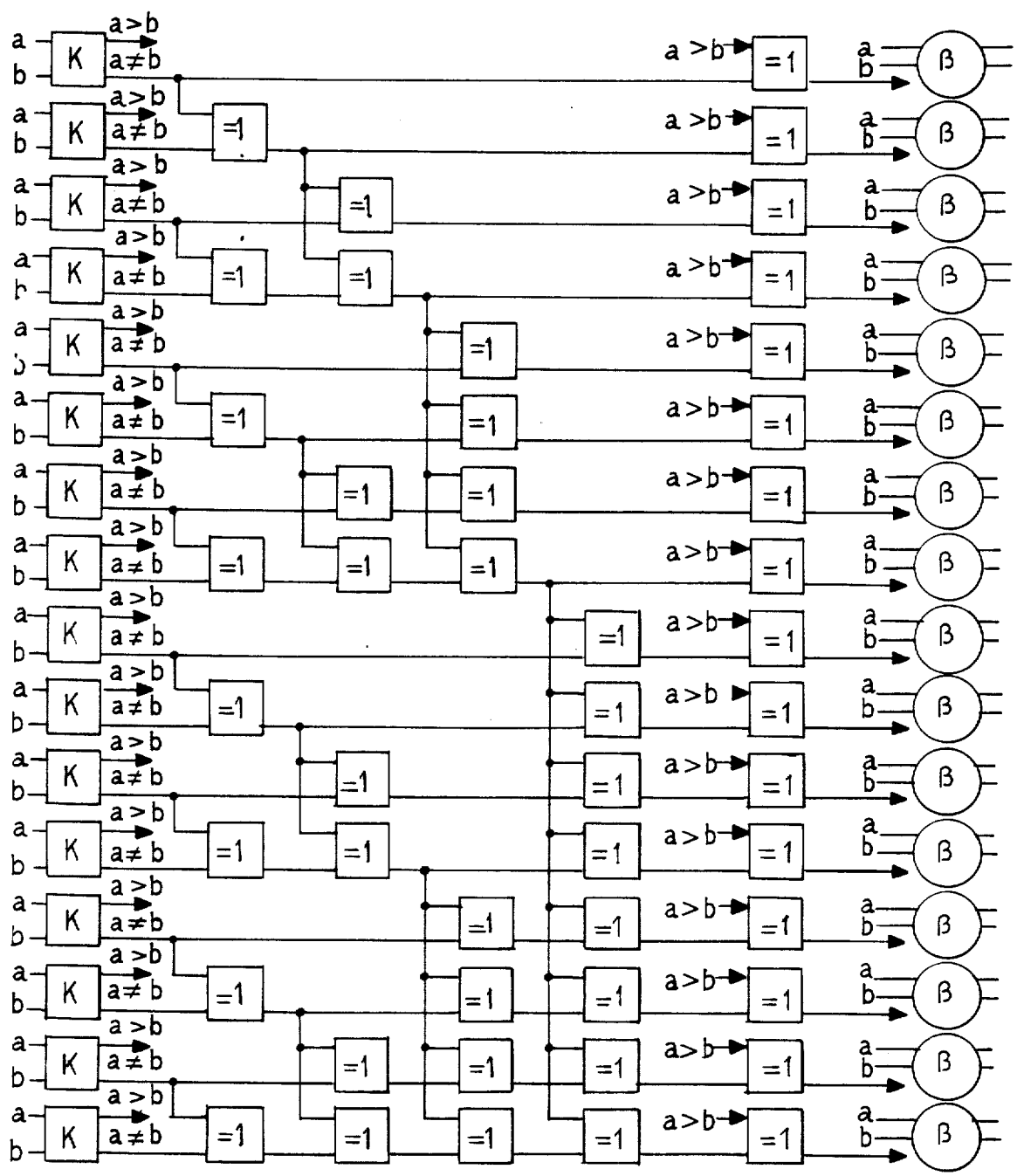
FIG. 7 shows an example of the circuit arrangement for sum formation comprising 32 inputs, 4 stages and a group size of 2.

Given large switching arrangements, a disadvantage of the circuit is that, given processing that is otherwise in parallel, the sum formation must ensue time-serially. Given, for example, 1024 inputs, a delay of 512 gate transit times derives. One possibility of diminishing this delay is comprised in dividing the inputs in groups in which the sum formation is derived separately for each group and, subsequently, having the results of a group from the respectively preceding group inverted in one step when the calculation requires this (viz., a heirarchic sum formation). When, for example, 1024 inputs are divided into two groups of 512 inputs and the sum formation in both groups is executed simultaneously or in time-parallel, there is produced a delay of 256 gate transit times plus one gate transit time for the conditioned inverting of the second group. The inputs can then be divided into a plurality of groups and these groups can be combined in a plurality of stages (FIG. 7 shows such an example comprising 32 inputs).

With the statement $$a = x_1 . x_2 \ldots x_n \quad (1a)$$

$$b = x_1 + x_2 + \ldots + x_n \quad (1b)$$

wherein
a = plurality of input gates
b = plurality of gate transit times
n = plurality of stages
x = group size of the $i^{th}$ stage,
the group size (given an established stage number n)

$$x_1 = x_2 \ldots = x_n = \sqrt[n]{a} \quad (2)$$

defines the minimum plurality of gate transit times. Inserting (2) into (1) yields $$b = n \cdot \sqrt[n]{a} \quad (3)$$

By differentiation and 0-setting, $$n = \ln(a) \quad (4)$$

is obtained for the optimum number of stages and, thus, $$x = \sqrt[\ln(a)]{a} = e \quad (5)$$

derives for the optimum group size (2). The following table shows an example for 1024 inputs (512 input gates).

| Stage Number | Group Size x | Plurality of Gate Transit Times b |
|---|---|---|
| 1 | 512 | 512 |
| 2 | 22.6 | 45.2 |
| 3 | 8 | 24 |
| 4 | 4.67 | 19 |
| 5 | 3.48 | 17.4 |
| 6 | 2.83 | 16.9 |
| 7 | 2.44 | 17.1 |

The plurality of gate transit times is dependent on the stage number, in the case of 1024 inputs.

In practice, the stage number n will only be increased as long as this yields a decisive reduction in the gate transit times because every additional stage increases the number of gates.

Even in the application of the above-described, step-by-step (heirarchic) sum formation, the calculating time can be so great that the clock rate must be reduced. An optimally high clock rate, however, is important for the capacity (throughput) of a switching node. In comparison thereto, the delay that a packet experiences in a switching node is of subordinate significance because, for example given a system referred to as "starlite" (International patent application WO 84/04011), it lies far below the limit of noticeability in the voice traffic (about 10 μs given 2048 inputs and a clock rate of 40 Mbit/s).

By contrast thereto, it is possible to delay the packets in short shift registers by a few clocks until the on-going sum formation has been concluded.

FIG. 8 shows a possible realization of the shift register arrangement. The first bit (activity bit) is directly conducted from the input to the first flip-flop FF to the comparator K, for on-going sum formation. The rest of the packet is conducted to the beta element delayed, by flip-flop stages. In the following stages, the blocks in which the sum formation is executed become smaller and the calculating time thus becomes shorter. This arrangement uses only a few shift register stages for the packet delay.

The advantages of the concentrator of the invention in comparison to the system disclosed by International patent application WO 84/04011 are compared in the following table:

|  | WO 84/04011 | Present Invention |
|---|---|---|
| Sum formation | ld n-place numbers must be added (n = plurality of inputs) | 1-place numbers must be added (mod-2 sum) |
| Plurality of Adders | n.ld n; Width ld n | n.ld n, n/2.ld n; width no transmission authorization |
| Algorithm | overall control information is centrally calculated | Step-by-step resolution of the sorting, calculation is decentralized |
| Complexity | 1dn-place sum formation must be realized in hardware. Twice the plurality of switching elements. Separation of the components for calculation and execution of the control | Only mod-2 sum formation is required. Integration of the components for calculation and execution of the control. |
| Line Management | Shifting the packets in the second powers in the "routing network". Separation of calculation and routing. Twice the plurality of routing lines (two possibility/packet) long line lengths | Perfect shuffle. Short lines are thus possible. |
| Expandability | Limited by adder size | Possible because of mod-2 sum formation (length of the control information is always only 1 bit) |
| Delay | low, shift register nonetheless required. | Not significantly greater due to heirarchic sum formation. |

It will be apparent that various modifications and/or additions may be made in the apparatus of the invention without departing from the essential feature of novelty involved, which are intended to be defined and secured by the appended claims.

What is claimed is:

1. A self-controlled concentrator operating packet-synchronized for fast data packet switching networks, wherein the first bits of each of the totality of data packets acts on the totality of the switch elements of the concentrator in accordance with the switch positions of such switch elements, characterized in that
   the switch elements are beta elements (β) having two inputs and two outputs, whereby a plurality of stages each having n/2 beta elements (β) are provided, whereby n is the number of inputs and n is the number of outputs of the concentrator;

a connecting structure connected between adjacent stages, said connecting structure constituting a perfect shuffle;

the stages are subdivided into blocks such that the plurality of blocks increases according to a power of 2 ascending from stage to stage, whereby the number of blocks in the first stage is $2^0$, the number of blocks in the second stage is $2^1$, etc., whereby there are n/2 blocks in the last stage, to form a binary tree structure; and at least one beta element ($\beta$) in each block selectively switching connections from its two inputs to its two outputs, in response to the signals supplied to the inputs of an adjacent beta element in said block, whereby a concentration of the bits having a prescribed binary value at the outputs of the concentrator is produced at the last stage of the concentrator to produce the concentration of the said data packets.

2. The concentrator according to claim 1, characterized in that the beta element ($\beta$) is composed of a signal-through connect part (D) and of a control part (S), whereby two inputs (a, b) of said beta element are respectively conducted both to the signal-through connect part (D) as well as to a comparator (K), an output of the comparator (K), namely the output a<b, is connected to a first input of a self-control part (S1) and a further output of the comparator, namely the output a≠b, is connected to the first input of a remote control part (S2); an external control line (c) is connected to a second input of the self-control part (S1) and to a second input of the remote control part (S2); an output (d') of the self-control part (S1) is connected to a control input of the signal-through connect part (D); an output (c') of the remote control part (S1) within the appertaining block of beta elements ($\beta$) is connected to the external control line (c) of the neighboring beta element ($\beta$); the external control line (c) of the lowest-order beta element ($\beta$) within the block of beta elements ($\beta$) is permanently wired to logical zero; that the output (c') of the remote control part (S2) of the highest-order beta element ($\beta$) in the block of beta elements ($\beta$) is unwired; and the circuit structure of the beta element ($\beta$) works according to the truth table

| Input | | | Output | | | |
|---|---|---|---|---|---|---|
| a | b | c | a' | b' | c' | d' |
| 0 | 0 | 0 | 0 | 0 | 0 | 0 |
| 0 | 0 | 1 | 0 | 0 | 1 | 1 |
| 0 | 1 | 0 | 1 | 0 | 1 | 1 |
| 0 | 1 | 1 | 0 | 1 | 0 | 0 |
| 1 | 0 | 0 | 1 | 0 | 1 | 0 |
| 1 | 0 | 1 | 0 | 1 | 0 | 1 |
| 1 | 1 | 0 | 1 | 1 | 0 | 0 |
| 1 | 1 | 1 | 1 | 1 | 1 | 1 | whereby the beta element ($\beta$) crosses its through-contact paths in respectively those instances wherein d' = 1.

3. The concentrator according to claim 2, characterized in that the settings of the beta elements ($\beta$) within a block of beta elements ($\beta$) are executed time-serially.

4. The concentrator according to claim 2, characterized in that the settings of the beta elements ($\beta$) within a block of beta elements ($\beta$) are executed by heirarchic sum formation (FIG. 7).

5. The concentrator according to claim 1, characterized in that each of the beta elements ($\beta$) of a stage is respectively preceded by a buffer that delays the data packets such that these data packets are not forwarded to the beta elements until the switching paths of all beta elements of this step are set.

6. The concentrator according to one of claim 1, characterized in that a buffer is provided before the concentrator for every input line, so that all data packets arriving chronologically offset are through-connected synchronously to the concentrator.

* * * * *